April 29, 1958  E. A. ANDRIOLA  2,832,881
WELDING TORCH
Filed July 1, 1954
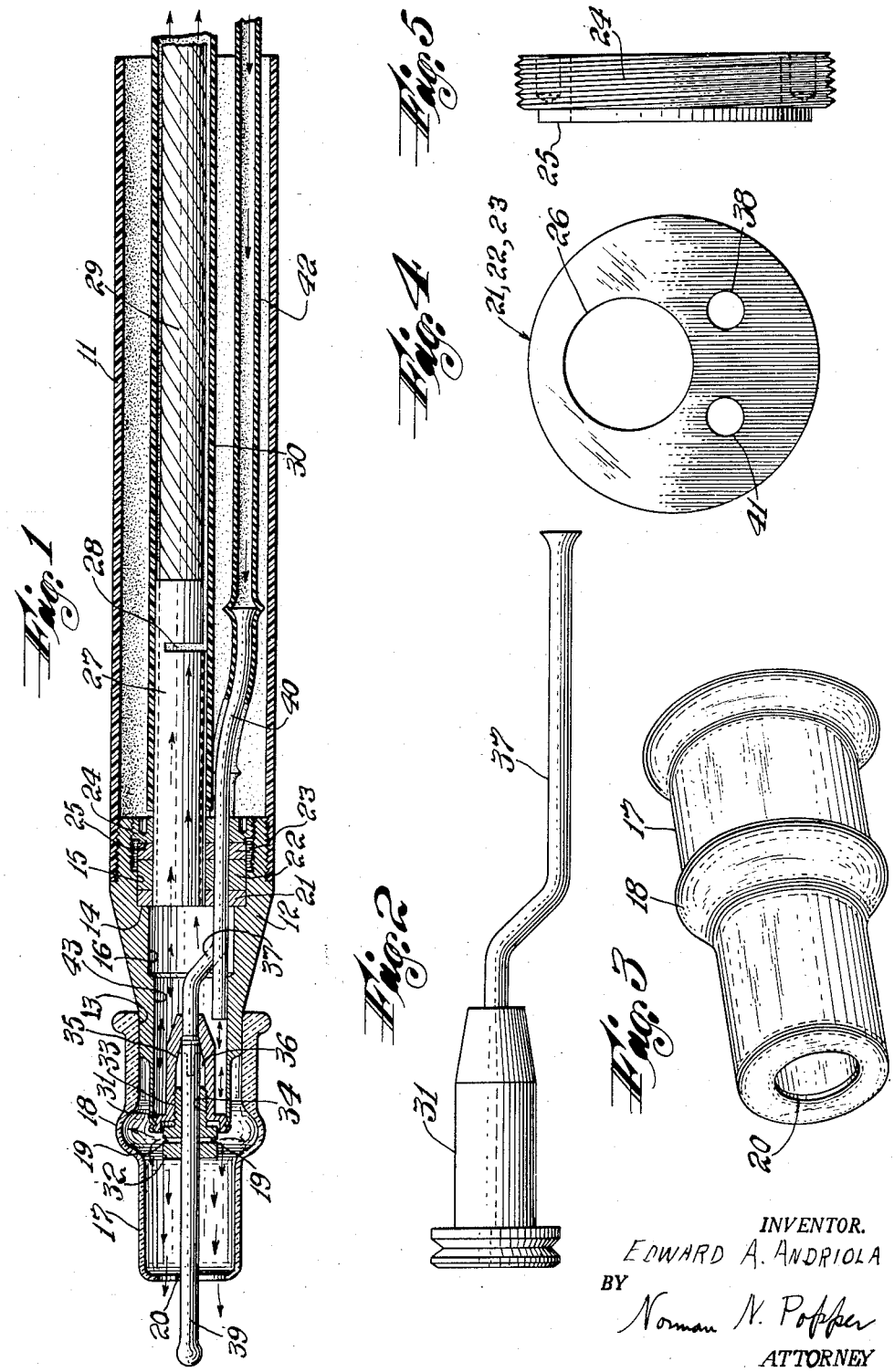
INVENTOR.
EDWARD A. ANDRIOLA
BY
Norman N. Popper
ATTORNEY United States Patent Office 2,832,881
Patented Apr. 29, 1958

2,832,881

WELDING TORCH

Edward A. Andriola, Lyndhurst, N. J.

Application July 1, 1954, Serial No. 440,727

10 Claims. (Cl. 219—75)

My invention relates generally to welding torches, and specifically to inert gas-shielded welding torches.

It is among the objects of my invention to provide a welding torch which makes most effective use of inert gases in the welding process.

It is yet a further object of my invention to provide a welding torch which is water-cooled and operates at a temperature comfortable to the touch.

A still further object of my invention is to provide a welding torch which has a minimum of structure in the vicinity of the rod so that the point of weld may be easily observed without obstruction.

Yet a further object of my invention is to insure a full-masking gaseous mantle at the point of weld thereby to insure a high quality weld.

Yet a further object of my invention is to provide a welding torch which utilizes a quartz or Pyrex cup which may be relatively transparent, will not cast shadows at the point of weld and may be readily seen through, so that the position of the rod may be maintained in proper relationship to the seam.

These objects and advantages as well as other objects and advantages may be achieved through the device illustrated in the appended drawings, in which:

Figure 1 is a sectional elevation showing the construction of a welding torch in accordance with my invention;

Figure 2 is a side elevational view of the chuck and gas tube assembly;

Figure 3 is a view in perspective of the bulb or tip;

Figure 4 is a front elevational view of a pressure-plate or gasket; and

Figure 5 is a side elevational view of the clamp ring.

Referring now to the drawings in detail, my invention is illustrated by the device shown in which there is a handle 11, formed of electrically insulating material which is preferably a plastic substance. This handle 11 is tubular in form and is internally threaded at one end. The threaded end is engaged with an annular electrically conductive tip 12; this tip is externally tapered, preferably of metal, and has an external thread at its larger end which is engaged with the internal thread on the handle 11; the opposite end 13 of the tip provides a seat for a bulb. The inside of the tip has a shoulder 14, which serves as a seat for various components as will hereafter appear. There are also three internal cavities 15, 16, 43.

A cup or bulb 17, formed of quartz or heat-resistant glass, is functionally engaged with the externally tapered portion 13 of the tip. This cup has an annular internal channel 18 positioned opposite the gas discharge channels 19 to insure the discharge of gas through the opening 20 in the tip in a smooth and even manner. The tip 17 is preferably transparent so as to minimize the shadows cast. It may be formed of quartz or some transparent material, such as a glass, which is highly resistant to heat. Seated against the shoulder 14 there is a pressure plate 21; this pressure plate 21 has a large central opening 26 and two smaller openings 38, 41. In the same cavity 15 and bearing on the pressure plate 21 is a sealing and supporting gasket 22. This gasket 22 likewise has a large central opening 26 and two smaller openings 38, 41. Immediately to the rear of this gasket is another pressure-plate 23, similar in form to the first-mentioned pressure-plate 21. Immediately to the rear of this pressure-plate is a clamp-ring 24. This clamp-ring is externally threaded and is engaged with the interior threads of the tip-body 12 on the cavity 15. The pressure plates 21 and 23 are preferably formed of metal, and the gasket 22 preferably formed of some soft, resilient readily deformable material. The clamp-ring 24 has an annular face 25, which bears on the pressure plate 23. Tightening the clamp-ring 24 exerts pressure on the pressure-plate 23, and compresses the gasket 22. The gasket will thereby grip any members introduced through the holes 26, 38, 41 therein.

It has been noted that each of the pressure-plates 21, 23, as well as the gasket 22, has a large central opening, 26, and two smaller openings 41, 38. Through this central opening 26 there is introduced a copper tube 27 extending to the cavity 16, and held in place by the clamping action of the gasket 22 aforementioned. The copper tube is soldered to the rear-most pressure-plate 23 at the point of contact between them. A slot 28 is formed toward the rear of the tube 27 whereby fluid entering the tube may be discharged therefrom. An electrically conductive cable 29 enters the rear of the tube and is attached thereto. A tube or hose 30 is fitted over the copper tube 27 and the cable 29 and serves to carry off water entering the copper tube from the front end and flowing toward the rear end out of the slot 28.

At the front end of the tip 12 a female chuck 31 is inserted. This chuck has an annular ring at the one end which is engaged with the tip 12 by having a portion end of the tip deformed to engage it. A male chuck 32 is inserted in the female chuck 31. The female chuck 31 has an internally threaded portion 33 engaged with a correspondingly externally threaded portion 34 on the male chuck. The female chuck has an interior tapered portion 35, which engages a tapered slotted portion 36, on the rear of the male chuck. Thus by tightening the male and female chuck portions with respect to each other, the rear 36 of the male chuck 32 becomes a clamp to hold any member inserted there through. The head of the male chuck has a pair of passages 19 communicating with the internal bore of the chuck. A gas tube 37, commencing inside the handle 11 passes through the hole 38 in the pressure-plates 21, 23, and is held in place by the gasket 22. This gas tube communicates with the rear of the female chuck 31, and introduces whatever gas is being used in the welding operation to the rear of the chuck. A tungsten welding rod 39 is held in the chuck. Since the fit of this rod in the chuck is not precise, the gas introduced through the tube 37, to the rear of the female chuck 31, flows around the rod, out through the front end of the male chuck 32, and out through the passages 19. The gas then moves through the bulb 17 and out the opening 20 at the point of weld. A water tube 40 also passes through a hole 41 in the pressure-plates 21, and 23. This water tube ends in the tip 12, adjacent to the chuck 31. Water is introduced into this water tube 40 by the hose 42, which enters the handle 11, and connects to the water tube 40. This water circulates through the cavity 43, flows into the cavity 16 and out through the tube 27. From the tube 27 it passes out the slot 28, and is carried out through the hose 30.

The operation of my welding torch involves the insertion of a tungsten rod 39 into the male chuck 32, which when engaged with the female chuck 31 serves to grip the rod in proper welding position. An appropriate gas, such as argon, helium, mixtures of gases or other gases is introduced through a hose which is connected to the gas line 37. Power is introduced to the rod 39 for the welding operation through the conductive cable 29, through a circuit including the tube 27, the pressure-plates 21, 23, the tip 12, male and female chucks 32, 31, the gas tube 37. Water is introduced through the hose 42, the tube 40, and discharged through the hose 30. It will be apparent that my welding torch is unique in that the water functioning as a cooling agent in the cavities 16, 43 is conducted to the immediate vicinity of the chuck which holds the tungsten rod. Under the circumstances of such a construction, the entire welding torch is water-cooled over substantially its entire area; operation will be carried on with the greatest coolness of the handle 11 and consequent conveniences in handling.

The foregoing description presents merely one embodiment of my invention. Many changes may be made in the construction, selection and arrangement of the various parts, all within the scope of the appended claims, without departing from the spirit of the invention.

I claim:

1. A welding torch comprising an electrically conductive gripping means for an electrode, an electrically conductive electrode engaged therewith, gas discharge passages extending from the interior of the gripping means, means for conducting gas to the interior of the gripping means, an electrically conductive tip attached to the gripping means and having a cavity therein surrounding the gripping means and defining a cooling chamber, a tubular handle attached to the tip, an electrically conductive tube communicating with the cavity in the tip and having a discharge slot, a means for securing the tube to the tip, a means directed toward the end of the cavity for conducting a cooling liquid into the cavity in the tip, a hose engaged with the tube for carrying off the cooling liquid that flows from the cavity in the tip into the tube, and a means for conducting an electric current to the tube.

2. A welding torch in accordance with claim 1, a transparent heat resistant bulb engaged with the tip.

3. A welding torch in accordance with claim 1, a transparent heat resistant bulb engaged with the tip, an annular internal channel in the bulb opposite the gas discharge passages, an open end on the bulb through which the electrode passes.

4. A welding torch in accordance with claim 1 in which the means for securing the tube to the tip is a plate, a gasket and a plate each having a passage therein in which the tube is positioned, and a clamp ring in threaded engagement with the tip and adapted to exert pressure on the plates whereby the gasket is compressed to engage the tube.

5. A welding torch comprising a tubular handle, liquid and gas lines entering the handle at one end and a liquid discharge line leaving the handle at the same end, an electrically conductive tube attached to the liquid discharge line, an electrically conductive cable in the discharge line connected to the tube, a tip attached to the handle, a gasket compressibly positioned at one end of the tip through which the gas line and the liquid entrance line and the tube enter an interior cavity in the tip, the liquid entrance line being directed toward the end of the cavity, a chuck attached at its outer end to the end of the tip, an electrode engaged with the chuck, the gas line connected to gas discharge passages in the chuck.

6. A welding torch comprising an electrically conductive gripping means for an electrode, an electrically conductive electrode engaged therewith, a cavity in the gripping means with gas discharge passages communicating with the cavity and the outside of the gripping means on the side wall thereof, means for conducting gas to the interior of the gripping means, an electrically conductive tip attached to the outer end of the gripping means and having a cavity therein surrounding the gripping means and defining a cooling chamber; a pressure plate, a gasket, a second pressure plate, and a threaded clamp ring in threaded engagement with the tip and serving as a closure for the cavity therein; a tubular handle attached to the tip, an electrically conductive tube communicating with the cavity in the tip through the closure and having a discharge slot, a line passing through the closure for conducting a cooling liquid into the cavity in the tip, said means for conducting gas passing through the closure, a hose attached to the tube for carrying off the cooling liquid that flows from the cavity in the tip into the tube, an electrically conductive cable in the hose connected to the tube, a transparent, heat resistant bulb engaged with the tip and having an orifice through which the electrode protrudes, an internal annular channel in the bulb opposite the gas discharge passage in the gripping means.

7. A welding torch comprising a tip composed of electrically conductive material having a high coefficient of thermal conduction, a female member engaged at its outer end with the tip, a male chuck member in threaded engagement with the female member, opposed passages in the male member for the conduction of gas, said passages being directed outwardly to the sides of the male member, a gas conductor connected to the female component of the chuck for conducting gas into the interior thereof, a chamber defined in the interior of the tip, a means directed toward the end of the chamber for conducting a coolant into the chamber in the interior of the tip, a means for discharging the coolant from the interior of the tip, an insulating handle secured to the tip, a transparent bulb engaged with the tip, an aperture in the end of the bulb, an electrode engaged with the chuck and positioned therein, said electrode extending through the end of the bulb, an annular channel in the bulb opposite the gaseous discharge passages in the male component of the chuck, said bulb having an end opening disposed in spaced relationship to the electrode.

8. A welding torch comprising an electrically conductive gripping means for an electrode, an electrically conductive electrode engaged therewith, gas discharge passages extending from the interior of the gripping means, means for conducting gas to the interior of the gripping means, an electrically conductive tip attached to the gripping means and having a cavity therein surrounding the gripping means and defining a cooling chamber, a tubular handle attached to the tip, an electrically conductive tube communicating with the cavity in the tip and having a discharge slot, a means for securing the tube to the tip, a means for conducting a cooling liquid into the cavity in the tip, said means having a discharge point immediately adjacent to the end of the tip and said gripping means, a hose engaged with the tube for carrying off the cooling liquid that flows from the cavity in the tip into the tube, and a means for conducting an electric current to the tube.

9. A welding torch comprising an electrically conductive gripping means for an electrode, an electrically conductive electrode engaged therewith, said gripping means having a cavity therein with gas discharge passages communicating with the cavity and the outside of the gripping means on the side wall thereof, means for conducting gas to the interior of the gripping means, an electrically conductive tip attached to the outer end of the gripping means and having a cavity therein surrounding the gripping means and defining a cooling chamber; a means for closing the cavity in the tip; a handle attached to the tip, an electrically conductive tube communicating with the cavity in the tip through the said means for closing the cavity in the tip and having a discharge slot, a line passing through the said means for closing the cavity in the tip for conducting a cooling liquid into the cavity in the tip, said means for conducting gas passing through the said means for closing the cavity in the tip, a hose attached to the tube for carrying off the cooling liquid that flows from the cavity in the tip into the tube, and electrically conductive cable in the hose, a transparent heat resistant bulb engaged with the tip and having an orifice through which the electrode protrudes.

10. A welding torch comprising an electrically conductive gripping means for an electrode, an electrically conductive electrode engaged therewith, said gripping means having a cavity therein with gas discharge passages communicating with the cavity and the outside of the gripping means on the side wall thereof, means for conducting gas to the interior of the gripping means, an electrically conductive tip attached to the outer end of the gripping means and having a cavity therein surrounding the gripping means and defining a cooling chamber, a means for closing the cavity in the tip, a handle attached to the tip, an electrically conductive tube communicating with the cavity in the tip through the said means for closing the cavity in the tip and having a discharge slot, a line passing through the closure for conducting a cooling liquid into the cavity in the tip, said means for conducting gas passsing through the means for closing the cavity in the tip, a hose attached to the tube for carrying off the cooling liquid that flows from the cavity in the tip into the tube, and electrically conductive cable in the hose, a transparent heat resistant bulb engaged with the tip and having an orifice through which the electrode protrudes, an internal annular channel in the bulb opposite the gas discharge passage and the gripping means.

References Cited in the file of this patent

UNITED STATES PATENTS

| | | |
|---|---|---|
| 2,251,316 | Bear et al. | Aug. 5, 1941 |
| 2,284,648 | Foreman | June 2, 1942 |
| 2,468,805 | Herbst | May 3, 1949 |
| 2,468,807 | Herbst | May 3, 1949 |
| 2,514,060 | Himmelman | July 4, 1950 |
| 2,555,017 | Tuthill | May 29, 1951 |

FOREIGN PATENTS

| | | |
|---|---|---|
| 394,950 | Great Britain | 1933 |